(12) United States Patent
Kunito et al.

(10) Patent No.: US 7,389,093 B2
(45) Date of Patent: Jun. 17, 2008

(54) CALL METHOD, CALL APPARATUS AND CALL SYSTEM

(75) Inventors: Yoshiyuki Kunito, Kanagawa (JP);
Satoshi Kawahata, Kanagawa (JP);
Akihiro Hokimoto, Saitama (JP);
Tadayuki Hattori, Tokyo (JP)

(73) Assignee: Sony Corporation, Tokyo (JP)

( * ) Notice: Subject to any disclaimer, the term of this patent is extended or adjusted under 35 U.S.C. 154(b) by 466 days.

(21) Appl. No.: 10/897,900

(22) Filed: Jul. 23, 2004

(65) Prior Publication Data
US 2005/0055202 A1 Mar. 10, 2005

(30) Foreign Application Priority Data
Jul. 25, 2003 (JP) .............................. 2003-280430

(51) Int. Cl.
*H04B 1/06* (2006.01)
(52) U.S. Cl. .................. 455/232.1; 455/267; 455/245.1; 455/240.1; 455/251.1; 375/295; 375/296
(58) Field of Classification Search .................. 375/295, 375/146
See application file for complete search history.

(56) References Cited
FOREIGN PATENT DOCUMENTS

| JP | 10 276247 | 10/1998 |
|---|---|---|
| JP | 2001 60993 | 3/2001 |
| JP | 2002 247156 | 8/2002 |

OTHER PUBLICATIONS
WO 01/15410 A2, PCT/JP00/05635.*
* cited by examiner

*Primary Examiner*—Joseph Feild
*Assistant Examiner*—Randy Peaches
(74) *Attorney, Agent, or Firm*—Fromer Lawrence & Haug LLP; William S. Frommer; Paul A. Levy

(57) ABSTRACT

A call apparatus, a call method and a call system, are disclosed, in which the problem otherwise caused by fixed setting of the sound volume level of the BGM or the effect sound with respect to the call voice may be overcome. A decoded output of a decoder 17 (PCM data) is multiplied in a gain adjustment unit 18 with a gain coefficient k2, as the SE sound volume level as set by a user. A multiplication output of the gain adjustment unit 18 is sent to an adder 13. The decoded output of a decoder 20 is multiplied in a gain adjustment unit 21 with a gain coefficient k3, as the BGM sound volume level, as set by the user. A multiplication output of the gain adjustment unit 21 is sent to an adder 13. The adder 13 sums the multiplication outputs of the gain adjustment units 12, 18 and 21 and sends a sum output to an encoder 22.

19 Claims, 14 Drawing Sheets

CALL METHOD, CALL APPARATUS AND CALL SYSTEM

BACKGROUND OF THE INVENTION

1. Field of the Invention

This invention relates to a call apparatus and a call method employing a network enabling the call under a high sound quality environment, such as the Internet. More particularly, it relates to a call apparatus, a call method and a call system, in which not only the call voice but also the background music (BGM) or the effect sound (SE) may be transmitted/received.

This application claims priority of Japanese Patent Application No.2003-280430, filed in Japan on Jul. 25, 2003, the entirety of which is incorporated by reference herein.

2. Description of Related Art

In the Japanese Laid-Open Patent Publication 2002-344571, the present Assignee has disclosed a technique pertinent to a call apparatus and a call method according to which a user may have a call more pleasantly as he/she listens to the music. In such call apparatus, music contents data, used as BGM, are stored in storage means and, as a caller talks with a callee over call means, music contents are reproduced by reproducing means from the storage means. At this time, control means manages control to enable a party of call to hear both the voice from the counterpart party and the reproduced sound of the contents. The call means also transmits the reproduced sound of the contents to the counterpart party. Meanwhile, during call, the reproducing level of the music, used as the BGM, is lowered to a preset level, provided from the outset. This technique enables the user to enjoy the music as BGM, as he/she is having a call.

The present Assignee has also disclosed, in the Japanese Laid-Open Patent Publication H7-143221, a technique pertinent to a telephone apparatus in which plural music contents used as holding tone are captured from outside over the telephone network, recorded on a magneto-optical disc in association with identification data, and reproduced as the holding tone responsive to e.g. the selection by the user in keeping with identification data.

[Patent Publication 1] Japanese Laid-Open Patent Publication 2002-344571

[Patent Publication 2] Japanese Laid-Open Patent Publication H7-143221

However, if the technique disclosed in the Patent Publication 1 is used, the sound volume level of the BGM or the effect sound is fixed at a preset level, provided from the outset, with respect to the usual voice level, and hence there is a risk that the user feels the sound volume level of the BGM or the SE to be too high depending on environmental conditions, and hence feels the speech voice as being hardly audible. Conversely, the user may feel that the BGM or SE is of too low sound volume level and hence may feel the call to be unpleasant.

If, in the telephone apparatus, supplying the BGM during call, the technique disclosed in the aforementioned Patent Publication 2 is used to store the holding tone on the recording medium, the music data different from the BGM is stored in a dedicated storage unit. The result is that limitations are imposed on the storage volume of other data to be stored on a recording medium, for example, a message for a telephone answering service.

SUMMARY OF THE INVENTION

It is therefore an object of the present invention to provide a call apparatus, a call method and a call system, whereby the aforementioned problems of the prior art may be resolved.

For accomplishing the above object, a call apparatus for bidirectional communication for dialog by voice over a network, according to the present invention, includes, as a transmitting system, first gain adjustment means for multiplying voice signals from voice transducing means with a variable gain coefficient to adjust the gain, the call transducing means transducing the voice, as picked up, into electrical signals, sound data storage means having stored therein sound data in terms of a file as a unit, decoding means for decoding file-based sound data read out from the sound data storage means, second gain adjustment means for multiplying a decoded output from the decoding means with a variable gain coefficient to adjust the gain, synthesizing means for synthesizing a first output from the first gain adjustment means and a second output from the second gain adjustment means, encoding means for encoding a synthesized output of the synthesizing means, and transmitting means for transmitting an encoded output from the encoding means over the network. The call apparatus also comprises, as a receiving system, receiving means for receiving an encoded output, transmitted from transmitting means of another call apparatus over the network, decoding means for decoding encoded data received by the receiving means, third gain adjustment means for multiplying a decoding output from the decoding means with a variable gain coefficient to adjust the gain, and sound outputting means for transducing an output from the third gain adjustment means into the sound to output the sound.

The first gain adjustment means multiplies the voice for call with a variable gain coefficient to adjust the gain, while the second gain adjustment means multiplies the sound data with a variable gain coefficient to adjust the gain. That is, the voice and the sound data are adjusted for gain independently of each other.

With the call apparatus according to the present invention, if, during call with the other call apparatus, employing a synthesized output from the synthesizing means, a holding button is actuated on a transmitting side, the second gain adjustment means substitutes a preset value, provided in advance, for the gain coefficient, adapted to be multiplied with music data, which is the sound sustained for several minutes as a unit, and which has been stored in the sound data storage means.

For accomplishing the above object, a call method for bidirectional communication for dialog by voice over a network, according to the present invention, comprises, on a transmitting side, a first gain adjustment step of multiplying voice signals from voice transducing means with a variable gain coefficient to adjust the gain, the call transducing means transducing the voice, as picked up, into electrical signals, a decoding step of decoding file-based sound data read out from sound data storage means, having sound data stored therein on the file basis, a second gain adjustment step of multiplying a decoded output from the decoding step with a variable gain coefficient to adjust the gain, a synthesizing step of synthesizing a first output from the first gain adjustment step and a second output from the second gain adjustment step, an encoding step of encoding a synthesized output of the synthesizing step, and a transmitting step of transmitting an encoded output from the encoding step over the network. The call method also comprises, on a receiving side, a receiving step of receiving an encoded output, transmitted from the transmitting step over the network, a decoding step of decoding encoded data received by the receiving step, a third gain adjustment step of multiplying a decoding output from the decoding step with a variable gain coefficient to adjust the gain, and a sound outputting step of transducing an output from the third gain adjustment step into the sound to output the sound.

The first gain adjustment step multiplies the voice for call with a variable gain coefficient to adjust the gain, while the second gain adjustment step multiplies the sound data with a variable gain coefficient to adjust the gain. That is, the voice and the sound data are adjusted for gain independently of each other.

For accomplishing the above object, in a call system for bidirectional communication for dialog by voice, using a plurality of call apparatus connected to the Internet, according to the present invention, each of the call apparatus includes, as a transmitting system, first gain adjustment means for multiplying voice signals from voice transducing means with a variable gain coefficient to adjust the gain, the call transducing means transducing the voice, as picked up, into electrical signals, sound data storage means having stored therein sound data in terms of a file as a unit, decoding means for decoding file-based sound data read out from the sound data storage means, second gain adjustment means for multiplying a decoded output from the decoding means with a variable gain coefficient to adjust the gain, synthesizing means for synthesizing a first output from the first gain adjustment means and a second output from the second gain adjustment means, encoding means for encoding a synthesized output of the synthesizing means, and transmitting means for transmitting an encoded output from the encoding means over the network. The call apparatus also comprises, as a receiving system, receiving means for receiving an encoded output, transmitted from transmitting means of another call apparatus over the network, decoding means for decoding encoded data received by the receiving means, third gain adjustment means for multiplying a decoding output from the decoding means with a variable gain coefficient to adjust the gain, and sound outputting means for transducing an output from the third gain adjustment means into the sound to output the sound.

The first gain adjustment means multiplies the voice for call with a variable gain coefficient to adjust the gain, while the second gain adjustment means multiplies the sound data with a variable gain coefficient to adjust the gain. That is, the voice and the sound data are adjusted for gain independently of each other.

With the call apparatus of the present invention, in which the first gain adjustment means multiplies the voice for call with a variable gain coefficient to adjust the gain, and in which the second gain adjustment means multiplies the sound data of the BGM or the SE with a variable gain coefficient to adjust the gain, the sound volume level of the BGM or the SE may be adjusted independently of that of the call voice to enable the use and performance convenient for and suited to the liking of the user as the high quality call voice is maintained.

Moreover, if, in the call apparatus of the present invention, a holding button is actuated on the transmitting side as the call apparatus is having a call with another call apparatus, using the synthesized output from the synthesizing means, the second gain adjustment means substitutes a preset gain coefficient for a gain coefficient which the second gain adjustment means multiplies with music data as the sound sustained for several minutes as a time unit, from the sound data storage means, so that there is no necessity for memorizing data for holding tone. That is, the BGM is used as the holding tone, and a dedicated file for the holding tone may be omitted without decreasing the storage capacity. In employing the BGM as the holding tone, an optimum sound volume level may be set. Moreover, the system design may be simplified by unifying the reproducing function.

With the call method of the present invention, in which the first gain adjustment means multiplies the voice for call with a variable gain coefficient to adjust the gain, and in which the second gain adjustment means multiplies the sound data with a variable gain coefficient to adjust the gain, the sound volume level of the BGM or the SE may be adjusted independently of that of the call voice to enable the use and performance convenient for and suited to the liking of the user as the high quality call voice is maintained.

With the call method of the present invention, in which the first gain adjustment step multiplies the voice for call with a variable gain coefficient to adjust the gain, and in which the second gain adjustment step multiplies the sound data with a variable gain coefficient to adjust the gain, the sound volume level of the BGM or the SE may be adjusted independently of that of the call voice to enable the use and performance convenient for and suited to the liking of the user as the high quality call voice is maintained.

With the call system of the present invention, in which the first gain adjustment means multiplies the voice for call with a variable gain coefficient to adjust the gain, and in which the second gain adjustment means multiplies the sound data with a variable gain coefficient to adjust the gain, the sound volume level of the BGM or the SE may be adjusted independently of that of the call voice to enable the use and performance convenient for and suited to the liking of the user as the high quality call voice is maintained.

DESCRIPTION OF THE PREFERRED EMBODIMENTS

As the best mode for carrying out the present invention, a Voice over IP (VoIP) call system, operating under the protocol of the Internet telephone, termed the VoIP, and a VoIP client, employed in this system, are hereinafter explained.

First, the schematics of the VoIP call system are explained. This VoIP call system transmits/receives the background music (BGM) or the sound effect (SE), in addition to the call voice between the VoIP clients.

Figure 1:
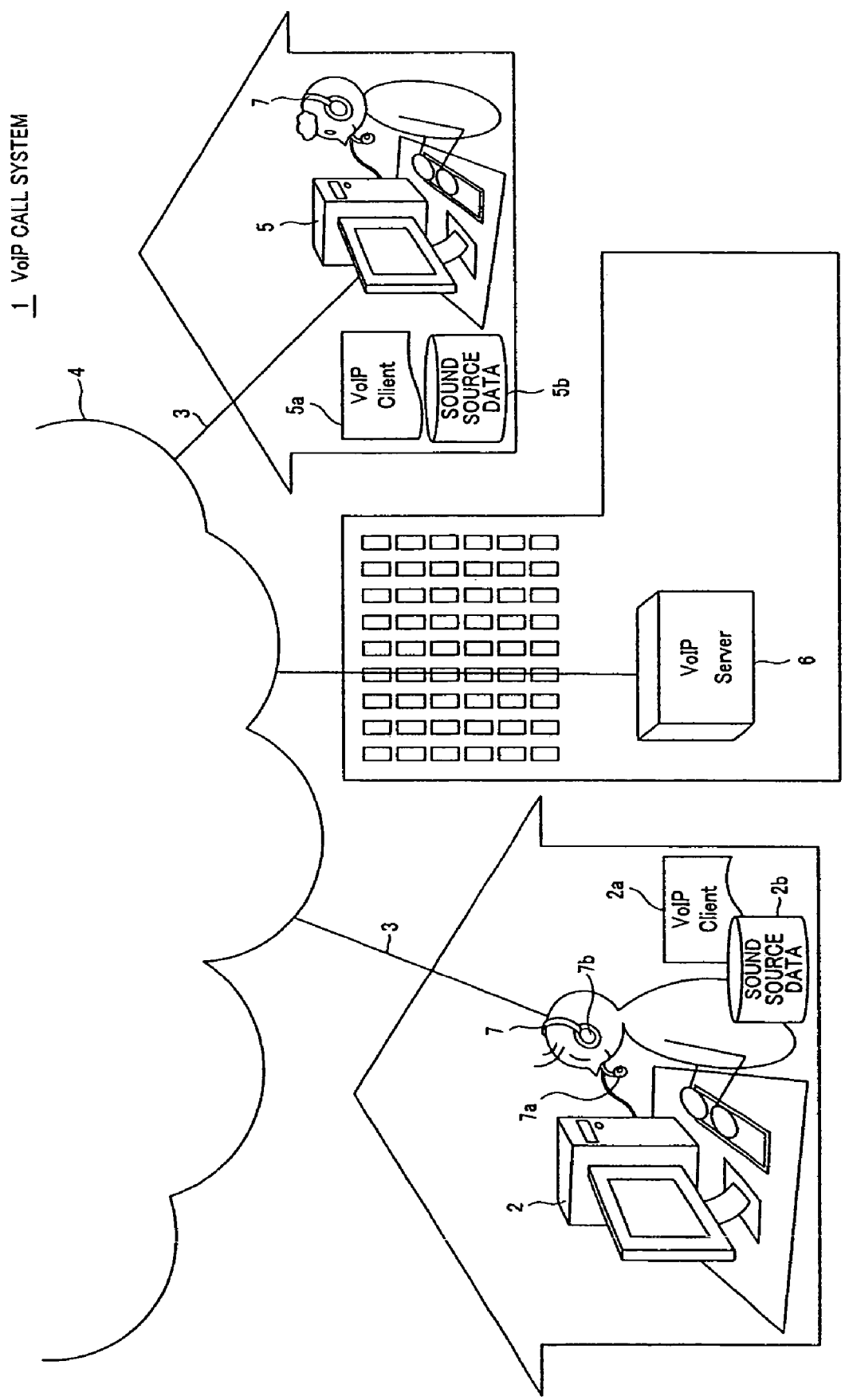
FIG. 1 schematically shows a VoIP call system.

In FIG. 1, a VoIP client 2 in a VoIP call system 1 is connected to the Internet 4 by for example a public network 3 to execute bidirectional communication (dialog) for having a dialog with call with another VoIP client 5 similarly connected to the Internet. A VoIP server 6 is also connected to the Internet 4 to manage communication control based on VoIP. Meanwhile, in this VoIP call system 1, the call between the VoIP clients 2, 5 is taken only as an example for explanation. That is, there are naturally three or more VoIP clients taking part in the call system.

The Internet 4 is a global network environment interconnecting a large number of communication networks, such as public networks, and information communication networks. Nowadays, broadband transmission is possible by coming into widespread use of the high speed and broadband communication networks. The network is formed with the communication network of 500 kbps or higher, using optical fibers, asymmetrical digital subscriber lines and wireless techniques.

The VoIP server 6 in the VoIP call system 1 supervises the IP addresses of contractors, while taking charge of authentication or managing control over communication. Of course, there may separately be provided a server for billing and a server processing the management information, such as an IP address of the contractor.

The VoIP client 2 is e.g. a personal computer (PC) to which are connected a microphone and a loudspeaker, or to which is connected a head set 7 made up of a microphone 7a and a headphone 7b. The PC becomes the VoIP client 2 by executing a VoIP client program 2a implemented by the software. In the following explanation, it is assumed that the VoIP client 2 calls up the VoIP client 5, that is that the VoIP client 2 first transmits and the VoIP client 5 receives. Of course, the VoIP client is a PC executing a VoIP client program 5a, and performs similar operations, in accordance with the present invention, when it first becomes the transmitting side.

During the VoIP call, the VoIP client 2, as the transmitting side, synthesizes the music sustained for e.g. several minutes as a unit as the background music (BGM), or the effect sound, sustained for e.g. several seconds as a unit, as the sound effect (SE), to the call voice, by way of so-called mixing. The VoIP client 2 individually adjusts the sound level of not only the call sound but also of the background sound or the effect sound, to solve the problem to be tackled by the present invention, that is, the problem that the call sound entered by the microphone 7a of the head set 7 is rendered less audible by the background sound set to a fixed sound volume level, or conversely, the effect of the background sound cannot be sufficiently displayed.

Figure 2:
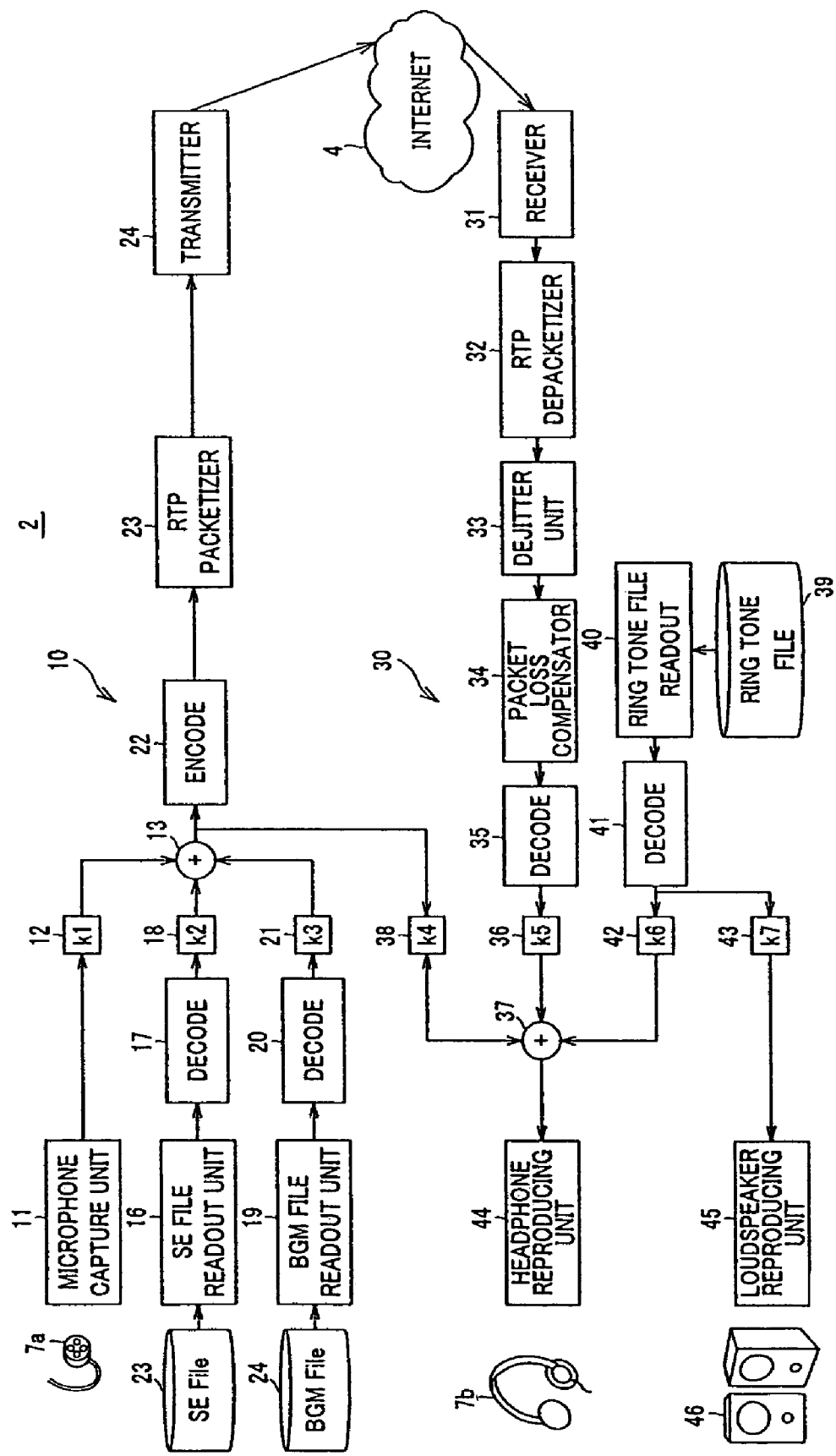
FIG. 2 is a functional block diagram of a VoIP client.

Referring to FIG. 2, the structure and the operation of the VoIP client 2, by means of which the sound level of the background sound or the effect sound may be individually adjustable, are now explained with reference to FIG. 2. By the VoIP client 2 executing the VoIP program 2a, a transmitting system 10 and a receiving system 30 are functionally constructed, as hereinafter explained. First, in the transmitting system 10, the electrical signals, corresponding to the user's call, picked up by the microphone 7a, are captured by a microphone capture unit 11. The electrical signals, derived from the call, as picked up by the microphone capture unit 11, are multiplied by a gain adjustment unit 12 with a gain coefficient k1, which is a microphone sound volume level as set by the user. The multiplication output of the gain adjustment unit 12 is supplied to an adder 13 as a synthesizing unit responsible for mixing.

The VoIP client 2 also has stored a plural number of files of file-based SE data in a SE file storage unit 14. These SE data are the effect sound sustained for several seconds, such as gunshots of a machine gun, rolls of thunder, hand clappings or the laughing voice, rendered into PCM data and compressed by compression techniques, such as MP3 (MPEG-1 Audio Layer III), MPEG4 or the ATRAC (Adaptive Transform Acoustic Coding). The SE file storage unit 14 may be exemplified by a hard disc drive (HDD), a ROM or a magneto-optical disc.

The VoIP client 2 also has stored a plural number of files of file-based BGM data in a BGM file storage unit 15. These BGM data are the background sound sustained for several minutes, such as sound of waves, chirping of birds or the music of variable genres, rendered into PCM data and compressed by compression techniques, such as MP3, MPEG4 or ATRAC.

The SE file, stored in the SE file storage unit 14, and selected by the user, is decoded by a decoder 17, as it is read out to a RAM, not shown, by an SE file readout unit 16, to become PCM data. The decoding output (PCM data) from the decoder 17 is multiplied with a gain coefficient k2, as the SE sound volume level, as set by the user, by a gain adjustment unit 18. The multiplication output of the gain adjustment unit 18 is sent to the adder 13.

The BGM file, stored in the BGM file storage unit 15, and selected by the user, is decoded by a decoder 20, as it is read out to a RAM, not shown, by a BGM file readout unit 19, to become PCM data. The decoding output (PCM data) from the decoder 20 is multiplied with a gain coefficient k3, as the BGM sound volume level, as set by the user, by a gain adjustment unit 21. The multiplication output of the gain adjustment unit 21 is sent to the adder 13. The adder 13 sums the multiplication outputs of the gain adjustment units 12, 18 and 21 under saturation processing to send the sum output to an encoder 22.

The encoder 22 compresses the sum outputs of the adder 13 (PCM data) by compression techniques, such as MP3, MPEG4 or ATRAC to tens of kbps, such as 64 kbps. The compression techniques by MP3, MPEG4 or ATRAC, used by the encoder 22, are the high efficiency audio compression encoding/decoding techniques, applied to e.g. the PCM audio data adopted with the CD. Hence, the sound packetized, transmitted over the Internet and reproduced on the receiving side, may be processed into stereo 2-channel sound of high sound quality.

The compression data are supplied to an RTP packetizer 23 designed to packetize data in accordance with Realtime Transport Protocol (RTP). The RTP packetizer 23 forms the compressed data into an RTP packet and packetizes the packet data into UDP and IP. The packetizing according to RTP will be explained in detail subsequently. The packetized packet data are sent from a transmitter 24 to the Internet.

In the receiving system 30, the packet data, transmitted from the other VoIP client 5 over the Internet, are received by the receiving system 30. The packetized data, received by the receiving system 30, is depacketized by an RTP depacketizer 32. A de-jitter unit 33 corrects the arrival time based on the time stamp and the sequential number of the RTP released from the IP and the UDP by the RTP depacketizer 32.

A packet loss compensator 34 compensates the packet loss, based on the time stamp and the sequential number of the RTP, to send the compensated data to a decoder 35. The decoder 35 decodes the compressed data, corrected for the arrival time and compensated for the packet loss, into PCM data, to send the resulting PCM data to a gain adjustment unit 36. The gain adjustment unit 36 multiplies the PCM data with a gain coefficient k5 which is the replay sound volume level as set by the user for the PCM data. The multiplication output of the gain adjustment unit 36 is sent to an adder 37. For co-owning the transmitted call with the callee, the transmitted call data is multiplied by a gain adjustment unit 38 with a gain coefficient k4 which is the feedback sound volume level as set by the user for the transmitted call data. The multiplication output of the gain adjustment unit is also sent to the adder 37.

Moreover, in this VoIP client 2, the ring tone is turned into e.g. PCM data, which is then pre-compressed by compression techniques, such as MP3, MPEG4 or ATRAC. The resulting pre-compressed data are then formed into file-based ring tone data and plural such files are stored in a ring tone file storage unit 39.

The ring tone file from the ring tone file storage unit 39 is preselected by the user and read out to a RAM, not shown, by a ring tone readout unit 40, in accordance with the incoming timing, so as to be decoded by a decoder 41 into PCM data. A decoded output of the decoder 41 is supplied to a gain adjustment unit 42 and to a gain adjustment unit 43. The gain adjustment unit 42 multiplies the ring tone decoding output (PCM data) with a gain coefficient k6, as the headphone ring tone volume as set by the user, and sends the resulting signal to the adder 37. The adder 37 sums a mixing output of the call voice as the multiplication output of the gain adjustment unit 36 and the background sound (PCM data) and the PCM data of the own call sound, as a multiplication output of the gain adjustment unit 38, and sends the sum output to a headphone reproducing unit 44. The headphone reproducing unit 44 converts the sum output into an analog signal, which is then amplified and sent to the headphone 7b. This headphone 7b utters the mixing sound to the user's ear.

At a timing the user is called up by the other VoIP client 5, the adder 37 sends to the headphone reproducing unit 44 the data corresponding to a product of a decoded output (PCM data) of the ring tone file as read out by the ring tone readout unit 40 and the gain coefficient k6 which is the headphone ring tone sound level as set by the user. The headphone reproducing unit 44 converts the ring tone data, multiplied by the gain coefficient k6, into analog data, which analog data is then sent to the headphone 7b. Thus, the headphone 7b utters the ring tone of the headphone ring tone sound volume level, as set by the user, to the user's ear, at a timing the user is called up by the other VoIP client 5.

The gain adjustment unit 43 multiplies the PCM data of the ring tone, output from the decoder 41, with a gain coefficient k7, which is the loudspeaker incoming sound volume level as set by the user, to send the resulting output to a loudspeaker reproducing unit 45. This loudspeaker reproducing unit 45 converts the multiplication output into an analog signal and amplifies the analog signal to output the resulting amplified signal. A loudspeaker 46 utters the incoming sound of the loudspeaker incoming sound volume level as set by the user for the loudspeaker.

The RTP based packetizing and depacketizing are hereinafter explained. The RTP is the transport protocol for transmitting/receiving the call or moving pictures in real-time on the IP network, such as the Internet, and is recommended by RFC1889. The RTP is located on a transport layer and is generally used on the User Datagram Protocol (UDP) along with the Real-Time Control Protocol.

The RTP packet is composed of an IP header, a UDP header, an RTP header and RTP data. In the RTP header, there are provided respective fields for storage of the version information (V), padding information (P), presence/absence of extension (X), number of contributing sources (CRSC), marker information (M), payload type (PT), a sequence number, RTP time stamp, a synchronization source (SSRC) identifier, and a contributing source (CRSC) identifier.

Figure 3:
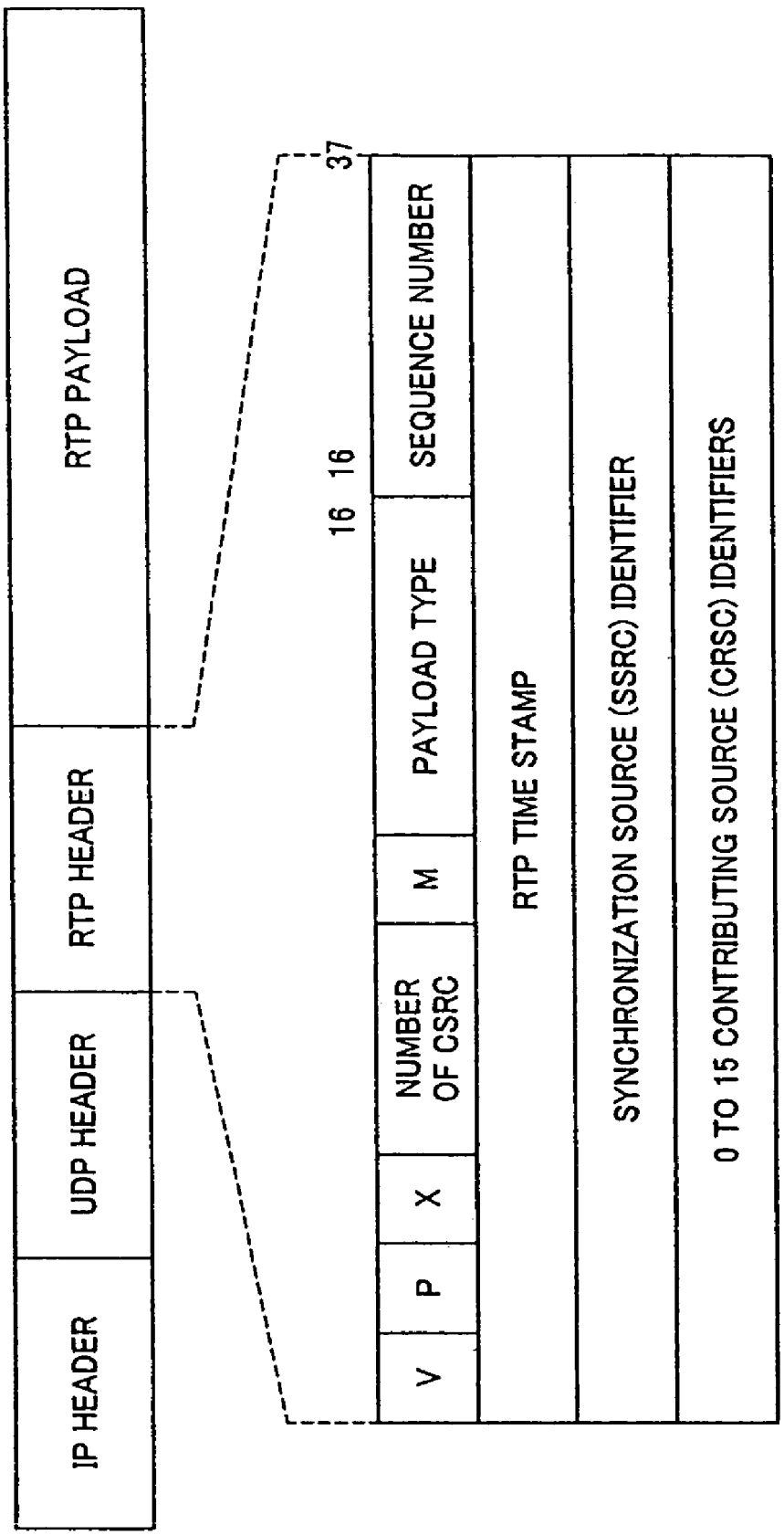
FIG. 3 depicts the format of an RTP packet.

The RTP packetizer 23 in FIG. 2 packetizes compressed data, output by the encoder 22, in accordance with the aforementioned RTP. The compressed data itself is contained in the RTP payload part shown in FIG. 3. This RTP packet is sent from the transmitter 24 over the Internet 4 to the other VoIP client, such as the VoIP client 5 of FIG. 1.

The receiving system 30 of the other VoIP client 5 receives the RTP packet by a receiving unit 31. The operation of the other VoIP client 5 is explained with reference to FIG. 2. The RTP depacketizer 32 separates the RTP header and the RTP data from the IP header and the UDP header. The sequence number and the time stamp, stored in the RTP header, are sent to the de-jitter unit 33.

The de-jitter unit 33 corrects inequalities in the arrival time based on the aforementioned sequence number and the time stamp. Since the RTP packet is transmitted over the Internet, along with other data, the RTP packet tends to be affected by congested transmission, such that the arrival time interval is not equal. That is, the arrival time interval may be stretched or congested on the time axis, thus possibly leading to unequal transmission time intervals. Thus, the de-jitter unit 33 corrects the arrival time intervals, based on the sequence number and the time stamp to provide for equal intervals.

The packet loss compensator 34 also compensates the packet loss, based on the aforementioned sequence number and time stamp. Since the RTP packet is transmitted/received over the Internet, the packets may be lost or become unable to be received. Thus, the packet loss compensator 34 uses a packet, which is the same as that directly previous to or next following the missing packet, in place of the missing packet, or sets the missing packet to zero, to compensate for the packet loss.

The decoder 35 decodes the mixing data of the call voice and the background sound, corrected for arrival time and compensated for packet loss, to give PCM data.

In the VoIP client 2, having this functional structure, what becomes outstanding by the application of the present invention is that not only the sound volume level of the call sound but also that of the background sound may be adjustable individually.

The adjustment of the sound volume level of the call sound is carried out by multiplying the call data with the gain coefficient k1, as the microphone sound volume level, as set by the user, by the gain adjustment unit 12. On the other hand, the adjustment of the sound volume level of the background sound is carried out by multiplying the respective audio data with the gain coefficient k2, as the SE sound volume level, as set by the user, or the gain coefficient k3, as the BGM sound volume level, similarly as set by the user, by the gain adjustment unit 18 or by the gain adjustment unit 21.

The audio data of the call sound data, effect sound or the BGM, adjusted in the respective sound volume levels by the gain adjustment units 12, 18 and 21, are summed together by the adder 13 and encoded by the encoder 22. The resulting data is packetized by the RTP packetizer 23 and transmitted from the transmitter 24 to the other VoIP client 5 as the callee.

The other VoIP client 5 as the callee receives the RTP packet sent over the Internet 4 by the receiving unit 31, de-packetizes the packet by the RTP depacketizer 32, corrects the arrival time interval by the de-jitter unit 33, compensates for the packet loss by the packet loss compensator 34 and decodes the resulting data by the decoder 35 into PCM data. The as-decoded audio data (PCM data) is multiplied by the gain adjustment unit 36 with the gain coefficient k5, as the sound volume level. The receiving side user may hear the call sound from the caller, mixed with the MGM or with the SE, over the headphone reproducing unit 44.

Figure 4:
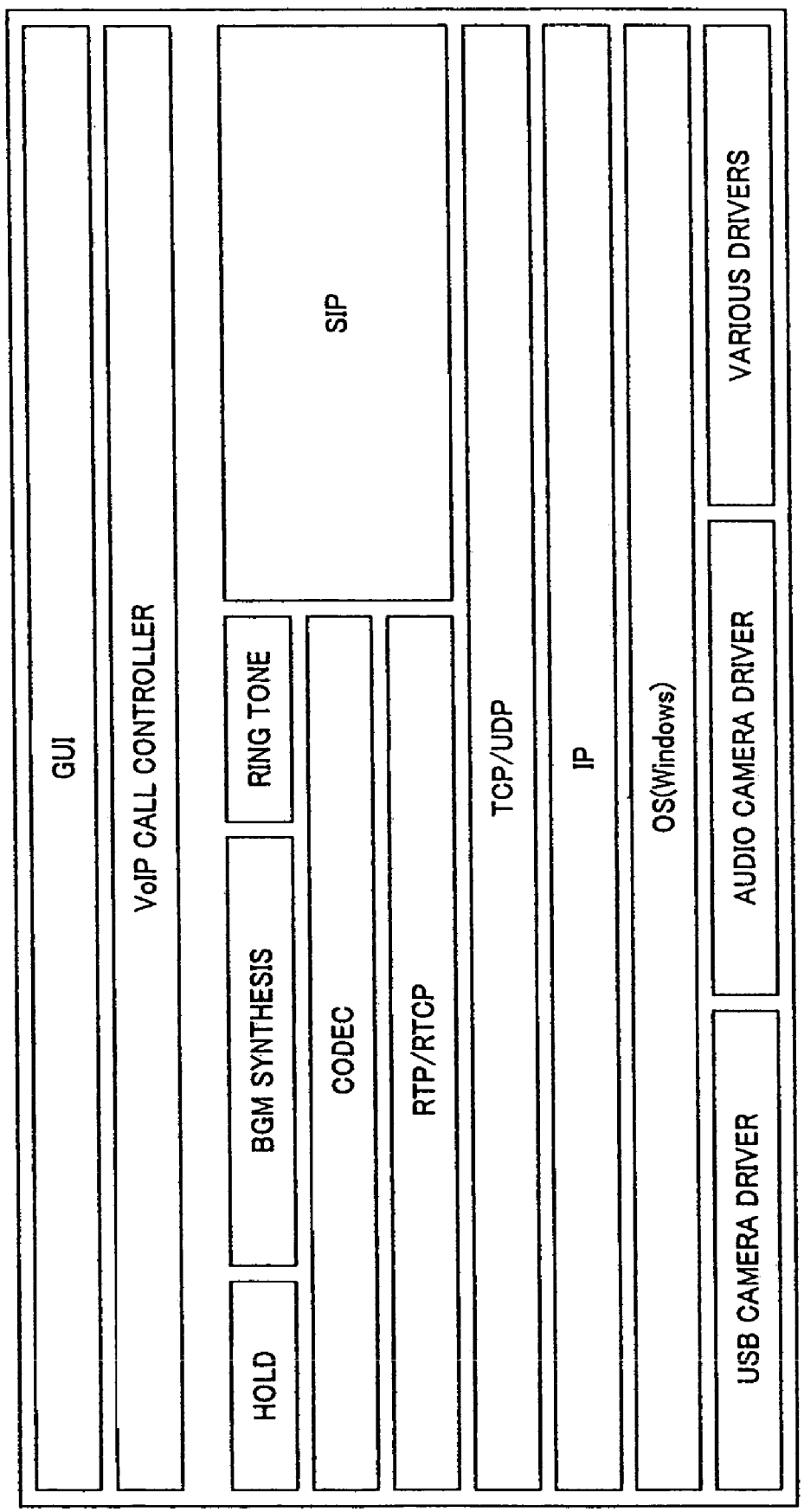
FIG. 4 shows a software module executed by a VoIP client.

This VoIP client 2 achieves the function shown in FIG. 2 by executing the software module consistent with the protocol of each layer based on the architecture of the Open System Interconnection (OSI) shown in FIG. 4.

Referring to FIG. 4, each layer is explained, beginning from the lowermost layer and proceeding towards the uppermost layer. First, as the functions as the physical layer, there are a Universal Serial Bus (USB) camera driver, USB audio driver and various other drivers. This is a layer for matching to physical conditions of the transmission conditions of video data from the camera driver and audio data from the audio driver. As the function as a data link layer, there is an Operating System (OS), which is responsible for error-less data transmission between neighboring nodes.

As the function as the network layer, there is the Internet Protocol (IP). The network layer selects transmission routes used for data transmission/reception to manage communication control, such as flow control or quality control. The Internet Protocol (IP), as a connectionless packet transfer protocol not pursuing the operational reliability, trusts to upper layers (transport layer and application layer) as to the reliability guaranteeing function, flow controlling function and the error recovery function.

As the function as the transport layer, there is the Transport Control Protocol/User Datagram Protocol. The transport layer effects end-to-end transmission, using the IP address, while managing flow control or sequence control, in accordance with the quality class requested, without dependency upon the network sort. The TCP has the reliability guaranteeing function, accords a sequential number to each byte of the transmitted data and re-sends data except if a receipt notice (acknowledgement) is sent from the receiver. The UDP provides the datagram sending function between the applications. In streaming reproduction of the call and the moving pictures, using the IP network, a transport protocol, retransmitting data in case of error occurrence, such as TCP, can generally not be used. Moreover, TCP is the protocol for one-for-one communication and is unable to transmit the information to plural parties. Thus, for such purpose, the UDP is used.

The UDP is designed for an application process to transmit data to another application process on a remote machine with the least overhead. Thus, only the transmission source port number, destination port number, data length and the check sum are entered in the UDP header, while there lacks the header in which to enter the number representing the sequence of packets in the TCP. Thus, if the packet sequence interchange has occurred due to e.g. transmission of packets over different routes on the network, it is not possible to perform the processing of restoring the sequence to a correct state. On the other hand, both TCP and UDP lack in a field in which to enter the time information, such a time stamps, at the time of transmission.

As the function as the session layer, there are the Session Initiation Protocol (SIP) and a module which represents an essential part of the present invention, that is, a module required in the software responsible for synthesis of the call sound with the BGM or SE, namely the generation of holding tone, BGM synthesis, ring tone generation, codec and RTP. The session layer is responsible for information transmission control, and supervises the dialog mode between the applications to perform control of call units. The SIP is the signaling protocol for the application layer for establishing, changing and terminating the multi-media session on the IP network, and is standardized in RFC3261.

As the function as a presentation layer, there is the VoIP call control. The presentation layer supervises the form of expression of the information transmitted/received between the applications to convert or encrypt data.

As the function as the application layer, there is the Graphical User Interface (GUI). The application layer supervises the exterior specifications of the communication functions used in a user program to exchange the corresponding information.

Figure 5:
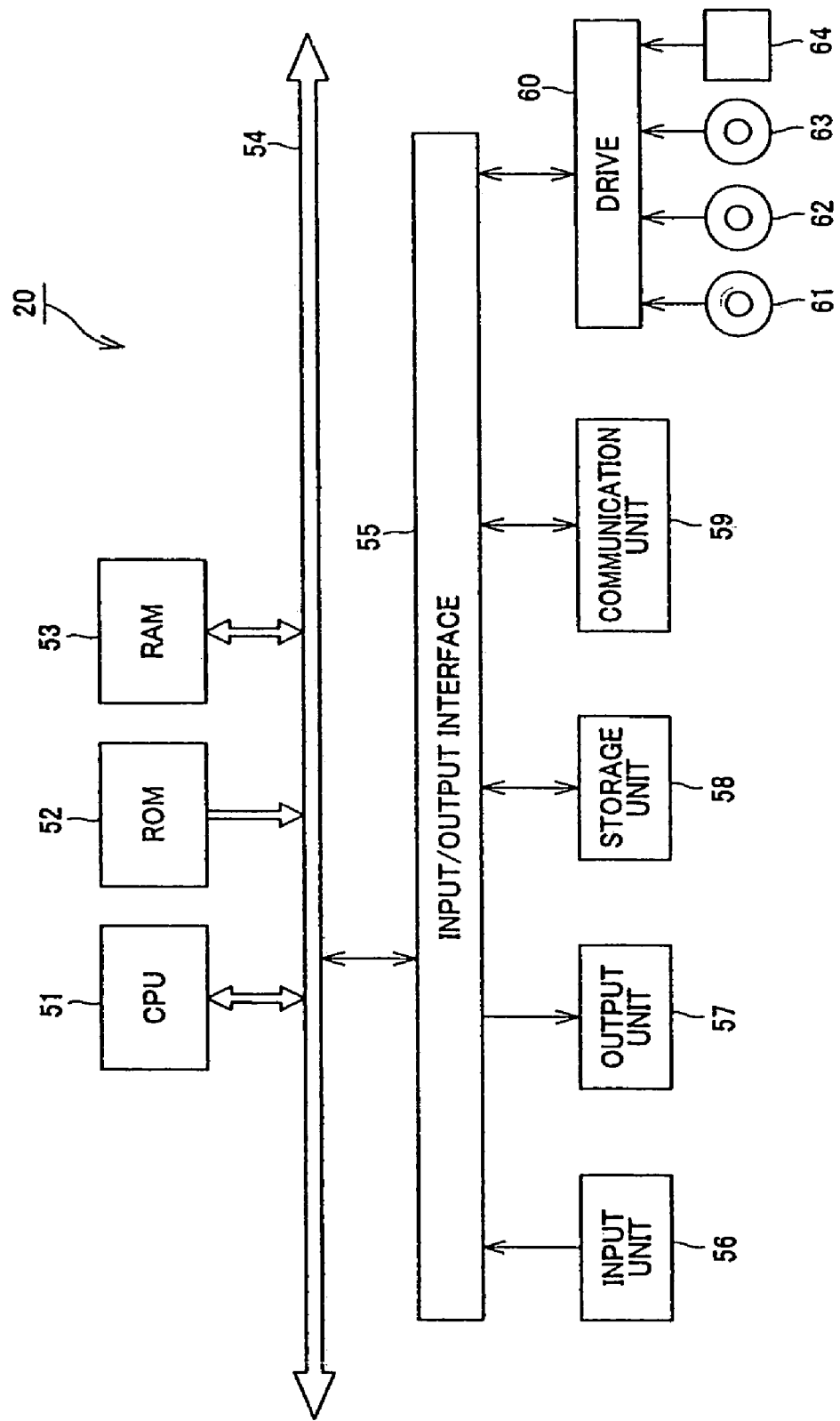
FIG. 5 schematically shows the hardware of a PC as a VoIP client.

The hardware structure of the VoIP client 2, actually carrying out the aforementioned software module, is now explained. FIG. 5 shows the structure of the VoIP client 2 as the PC. Referring to FIG. 5, a CPU 51 executes various processing operations in accordance with various programs forming the aforementioned software module stored in a ROM (Read-Only Memory) 52 and also with various programs forming the aforementioned software module loaded from a storage unit 58 to a RAM (Random-Access Memory) 53. In this RAM 53, there are stored data needed for the CPU 51 to execute various processing operations.

The CPU 51, ROM 52 and the RAM 53 are interconnected over a bus 54. To this bus 54 is also connected an input/output interface 55. To this input/output interface 55 are connected an input unit 56, formed by a keyboard or a mouse, a display formed by a CRT or an LCD, an output unit 57, formed by a headphone or a loudspeaker, the aforementioned storage unit 58, formed by e.g. a hard disc, and a communication unit 59, formed by a modem or a terminal adapter. The microphone 7a is comprised in the input unit 56. The headphone 7b is comprised in the output unit 57.

The communication unit 59 carries out communication processing over the Internet 4, while outputting data received from the callee to the CPU 51, RAM 53 and to the storage unit 58. This storage unit 58 reciprocates data with the VPU 51 to save or erase the information. The communication unit 59 also executes communication processing of analog or digital signals with other clients.

To the input/output interface 55, there is connected a drive 60, as necessary. There are also mounted a magnetic disc 61, an optical disc 62, a magneto-optical disc 63 and a semiconductor memory 64, and the computer program read therefrom is installed as necessary in the storage unit 58.

Meanwhile, the storage unit 58 is e.g. a HDD, and forms the SE file storage unit 14, BGM file storage unit 15 and the ring tone file storage unit 39 shown in FIG. 2.

The above-described hardware structure represents a PC structure of the VoIP client 2 or 5, while also representing the structure of the VoIP server 6 or a Web server as explained subsequently.

Figure 6:
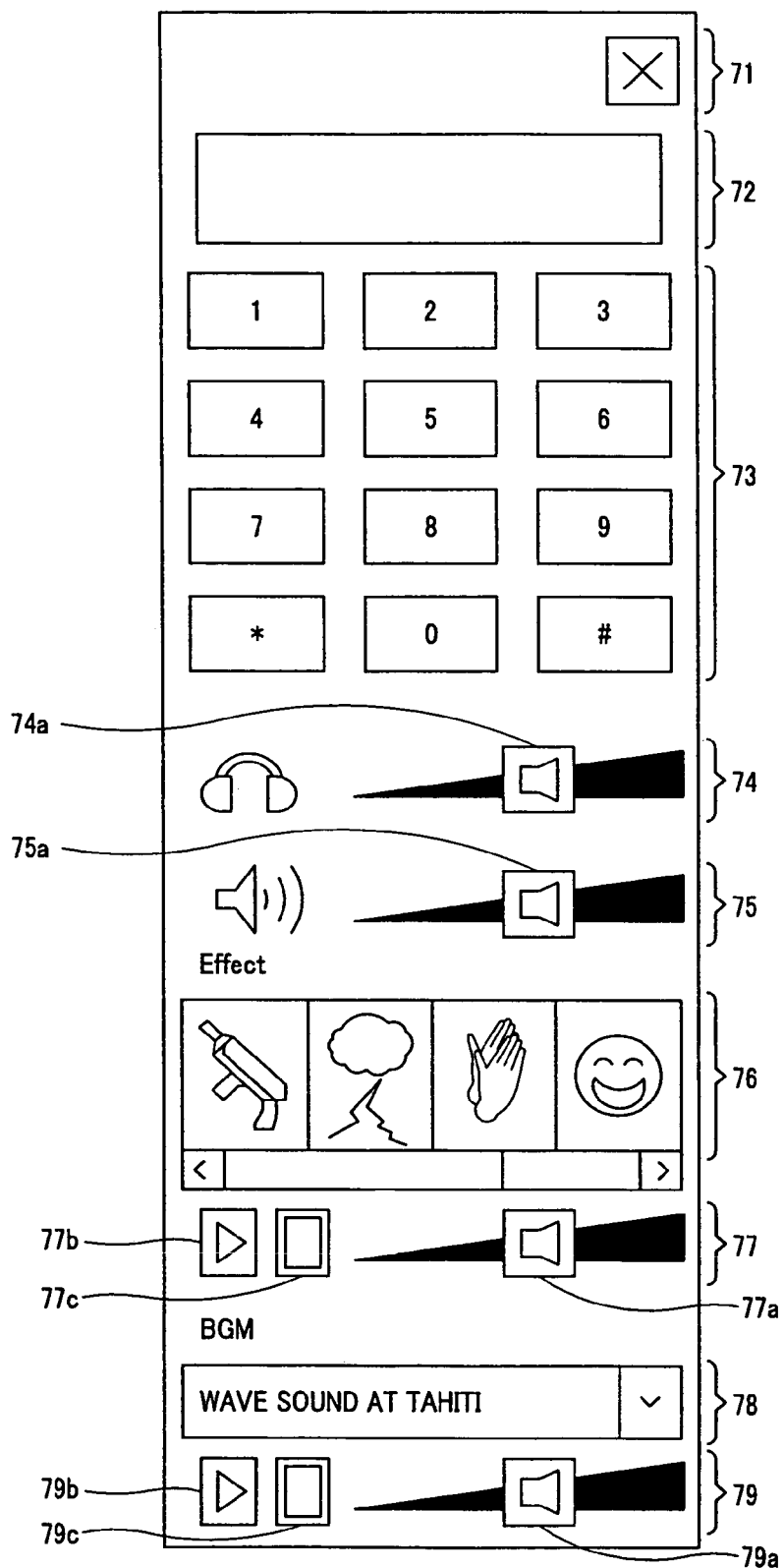
FIG. 6 shows the GUI demonstrated on a display of the VoIP client.

The GUI (Graphical User Interface), demonstrated on a display, forming the output unit 57, is explained with reference to FIG. 6. This GUI belongs to the application layer of the VoIP client. The GUI is an interface for the user to visually run the PC, and handles the information manually entered by the user. This GUI includes an application controller 71, an information display unit 72, a dial unit 73, a headset volume unit 74, a loudspeaker volume unit 75, an sound effect (SE) selection display unit 76, an SE controller 77, a BGM selection display unit 78 and a BGM controller 79, looking from above towards below in FIG. 6.

The application controller 71 performs termination processing for the VoIP client application. The information display unit 72 displays the dial number and the callee information (such as busy signal). The dial unit 73 is a ten-key used for dialing the VoIP callee. The headset volume unit 74 is used for adjusting the sound volume output from the headphone 7b of the headset 7. The gain coefficient k5 in the gain adjustment unit is set by the user causing left-and-right movement of the slider 74a using the mouse. The headset volume unit may also be used for adjusting the sound volume of the ring tone output from the headphone 7b. In this case, the gain coefficient k6 in the gain adjustment unit 42 is set by the user causing left-and-right movement of the slider 74a using the mouse.

The loudspeaker volume unit 75 is used for adjusting the volume of the ring tone output from the loudspeaker 46. The gain coefficient k7 in the gain adjustment unit 43 is set by the user causing left-and-right movement of the slider 75a using the mouse.

The SE selection display unit 76 is used for displaying a usable SE sound source data file for user selection (SE file stored in the SE file storage unit 14), and demonstrates the effect sound, such as gunshots of a machine gun, rolls of thunder, hand clappings or cheer for selection by the user. The SE controller 77 allows the user to reproduce and stop the effect sound and the sound volume adjustment via input init, such as a mouse, using a replay button 77b, a stop button 77c and a slider 77a.

Assume that the user has selected a desired SE from the SE selection display unit 76, using a mouse, has caused the slider 77a to be moved to a proper position and has clicked the replay button 77b. The decoder 17 then decodes the desired SE file, as read out by the SE file readout unit 16, to PCM data. The PVC data of the SE file is then multiplied by the gain adjustment unit 18 with the gain coefficient k2, which is the SE sound volume level for the slider 77a, and the resulting signal is then output to the adder 13. Thus, the user is able to express the feeling he/she entertains for the callee, by the various effect sounds.

The BGM selection display unit 78 displays available BGM sound source data files for user selection. The BGM controller 79 allows the user to reproduce or stop the BGM, with the aid of the input unit, such as a mouse, by the replay button 77b, stop button 77c and the slider 77a.

Assume that the user has selected a desired BGM from the BGM selection display unit 78, using a mouse, has caused the slider 79a to be moved to a proper position and has clicked the replay button 79b. The decoder 20 then decodes the desired BGM file, as read out by the BGM file readout unit 19, to PCM data. The PVC data of the BGM file is then multiplied by the gain adjustment unit 21 with the gain coefficient k3, which is the BGM sound volume level for the slider 79a, and the resulting signal is then output to the adder 13. Thus, the user is able to express the feeling he/she entertains for the callee, or the ambient atmosphere, with the adjusted sound volume, as in the case of the SE described above.

Thus, with the VoIP client 2, executing the various programs, forming the aforementioned software module, it is possible to solve the problem that the call sound, supplied from a microphone, is hard to hear due to the background sound of the fixed sound volume level, or that, conversely, the effect as the background sound is not sufficiently demonstrated. Moreover, since the transmitter and the receiver use PCM data, which PCM data is then compressed by compression techniques, such as MP3, MPEG4 or ATRAC, transmission of audio data of high sound quality may be achieved, while the two-channel reproduction, for example, may be provided. Thus, by proper mixing of the call sound and the background sound, outstanding sound localization of the call sound from the transmitter may be achieved.

Figure 7:
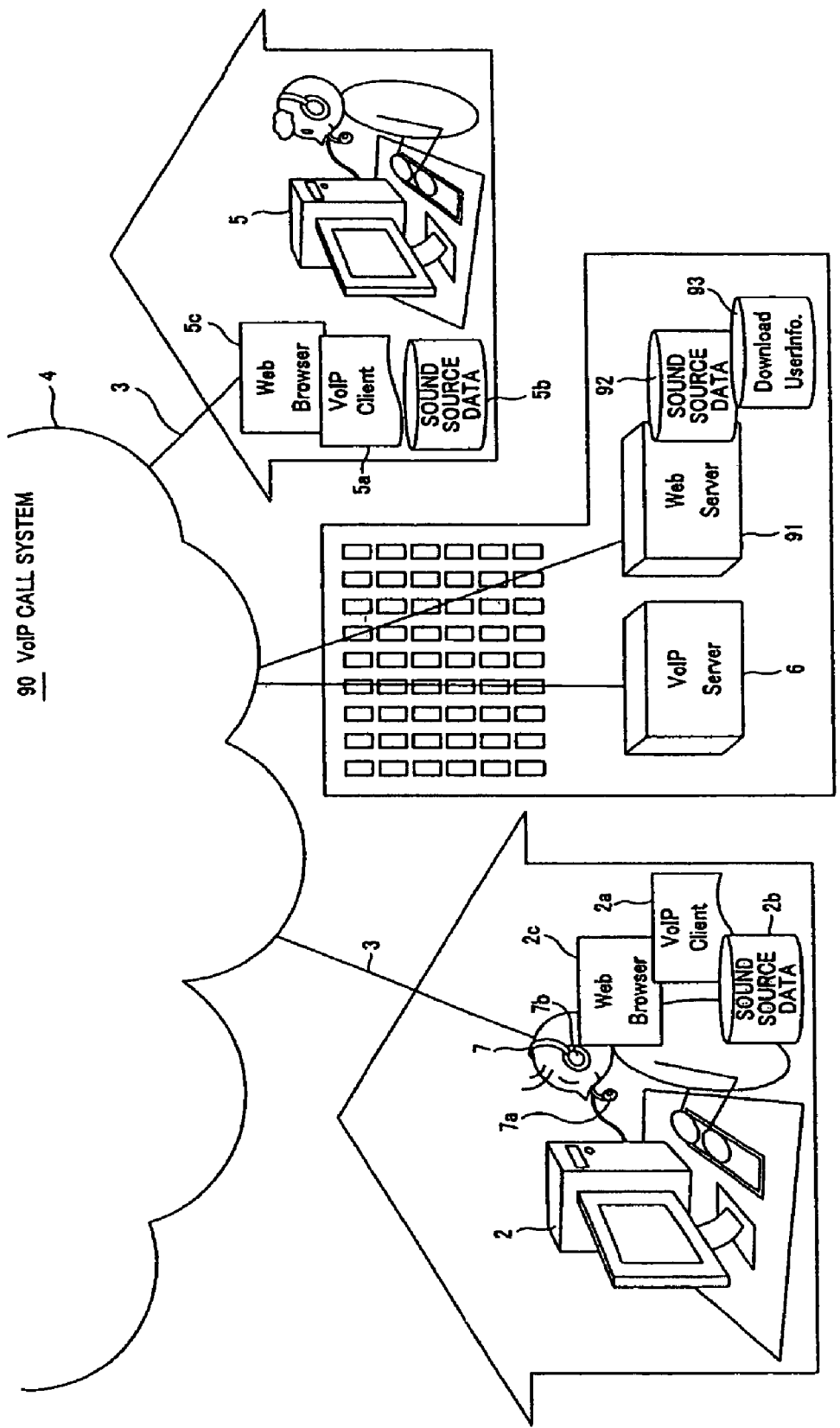
FIG. 7 schematically shows another VoIP call system.
Figure 8:
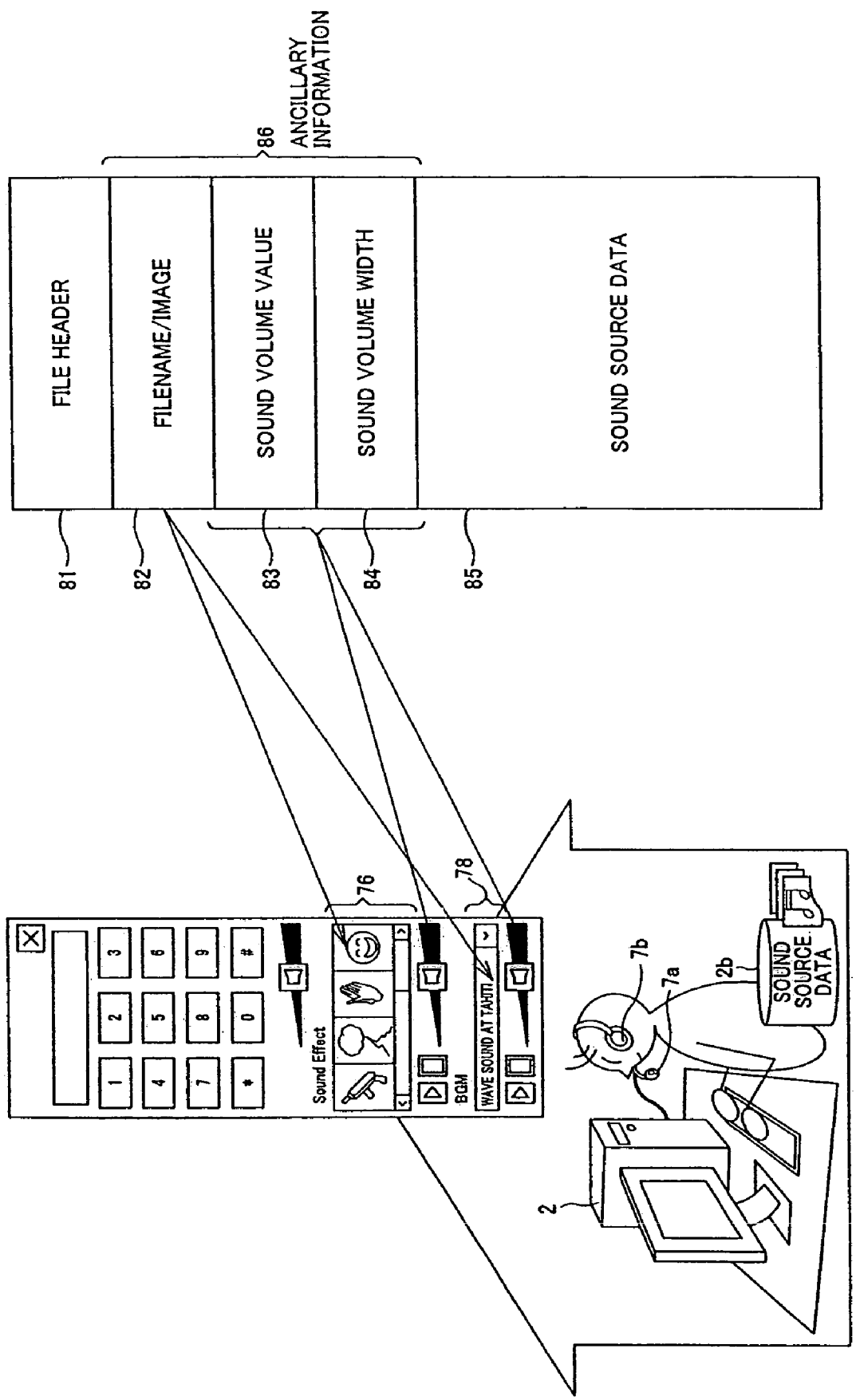
FIG. 8 depicts the format of a sound source data file stored in a database of a Web server.

Another concrete embodiment of the VoIP call system, in which the VoIP client 2 may be applied, is now explained with reference to FIGS. 7 and 8. Referring to FIG. 7, this VoIP call system 90 includes a Web server 91, cooperating with the VoIP server 6, within or in the vicinity of the center, as in the case of the VoIP server 6. The SE file or the BGM file, for example, is stored as sound source data in a database 92 of the Web server 91. That is, the database has stored therein file-based data, obtained on converting the SE or the BGM into PCM data and on compressing the resultant data by compression techniques, such as MP3 (MPEG-1 Audio Layer-III), MPEG4 or ATRAC (Adaptive Transform Acoustic Coding). Moreover, the user information on receipt of a downloading request from the VoIP client is stored in a database 93 as the download user information.

The VoIP clients 2 and 5 are each provided with a function of accessing the Web server 91, using Web browsers 2c, 5c, respectively. The VoIP clients 2 and 5 are able to download sound source data, such as SE or BGM file, from the database 92, subject to payment of the fee to service providers supervising the Web server 91. The downloaded sound source data file is stored in sound source data storage units 2b, 5b, formed in a HDD, such as the storage unit 58.

The Web server 91 has the function of storing the ID/password, downloaded from one sound source data file to another, as the user information (downloaded user information) in the database 93.

Since the Web server 91 is connected on the Internet 4, the VoIP client 2 is able to designate usable sound source data, not only before call on VoIP, but also during call, and to mix the data with the input call data file. The sound source data file and the input call data file, thus mixed together, are encoded and packetized, in accordance with the prescribed CODEC, so as to be periodically transmitted to the VoIP client of the callee.

The VoIP client 5, as the callee, decodes packets received periodically to hear the sound data stream and the call data stream simultaneously. Each of the sound source data files, stored in the database 92 of the Web server 91, includes the information of a default sound volume 83 and the information of a sound volume width 84, as shown in FIG. 8. The file structure is now explained in more detail. In rear of a file header 81, there is a filename/image 82, demonstrated in the SE selection display unit 76 and in the BGM selection display unit 78. The filename/image is followed by a sound volume value 83, properly adjusted from file to file, and the sound volume width 84 between the maximum and minimum values, and then by sound volume data 85. The filename/image 82, sound volume value 83 and the sound volume width 84 represent ancillary information 86 of the sound volume data 85.

Thus, in each of the sound source data files, stored in the database 92 of the Web server 91, there are individually provided the information on the sound volume value 83 and the information on the sound volume width 84, so that the proper sound volume may be set from sound source data to sound source data. Consequently, the background or effect sound may be reproduced promptly without the user undertaking sound volume adjustment at the outset.

Moreover, the VoIP clients 2 and 5 may use the BGM as the holding tone. The operation of the VoIP client 2 reproducing the BGM file of the BGM file storage unit 15 is hereinafter explained.

Figure 9:
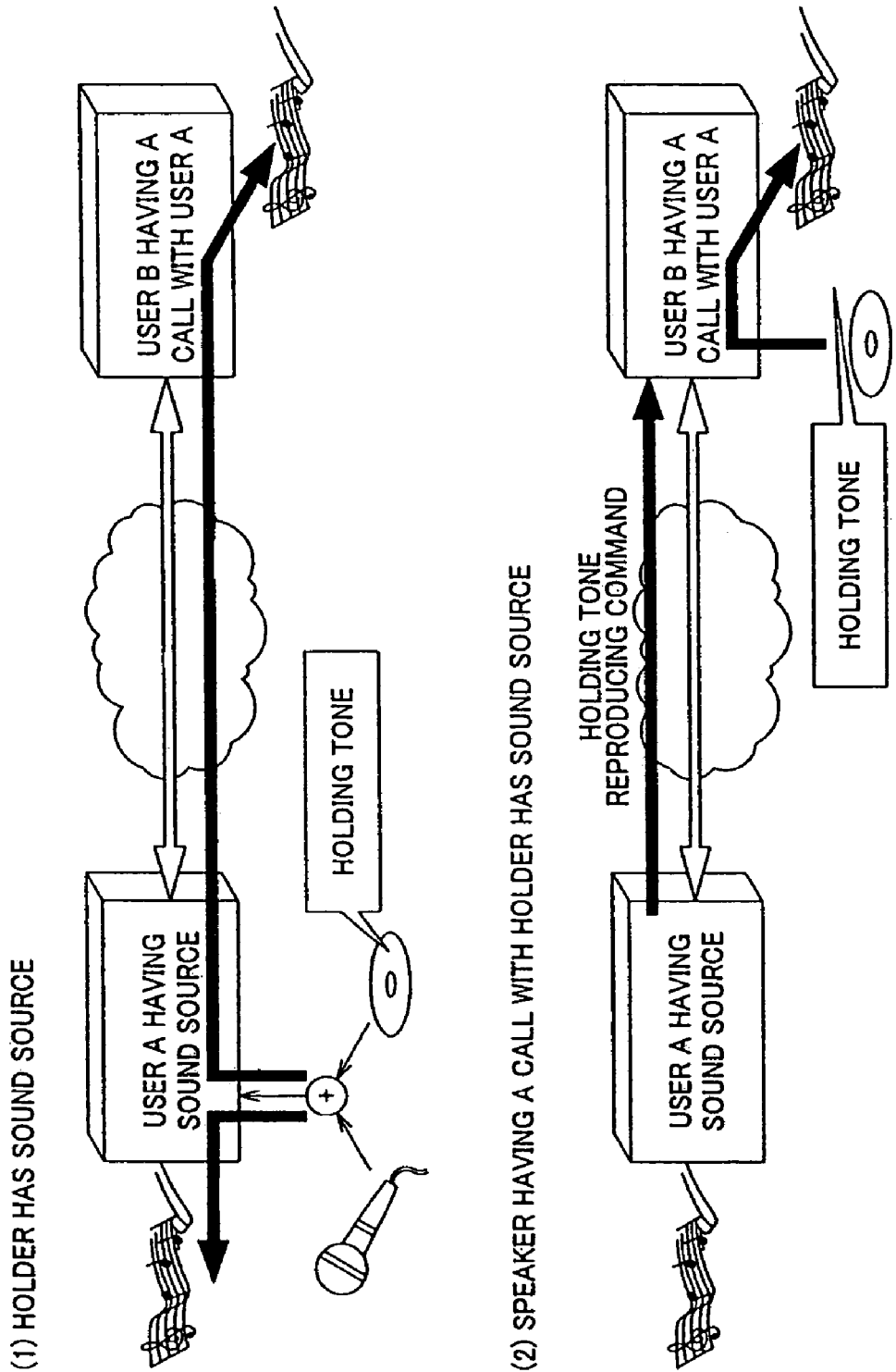
FIG. 9 illustrates the sound source of a holding tone.

As for the holding tone, a holding party (user A) may have a sound source, as shown in FIG. 9(1), or a party talking with the holding party (user A), that is, a user B having the talk with the user A, may have a sound source, as shown in FIG. 9(2). In the case of FIG. 9(1), in which the holding party has the sound source, transmission may be made in the same was as in the BGM reproducing system composed of the BGM file storage unit 15, BGM file readout unit 19, decoder 20 and the gain adjustment unit 21, shown in FIG. 2. Thus, the holding tone may be realized by a scheme which is the same as the scheme of the BGM reproducing system.

However, with BGM, it is a frequent occurrence that, due to its form of use, the sound volume is low and is not appropriate. Thus, in using the BGM as the holding tone, it may be contemplated to adjust the sound volume automatically.

Figure 10:
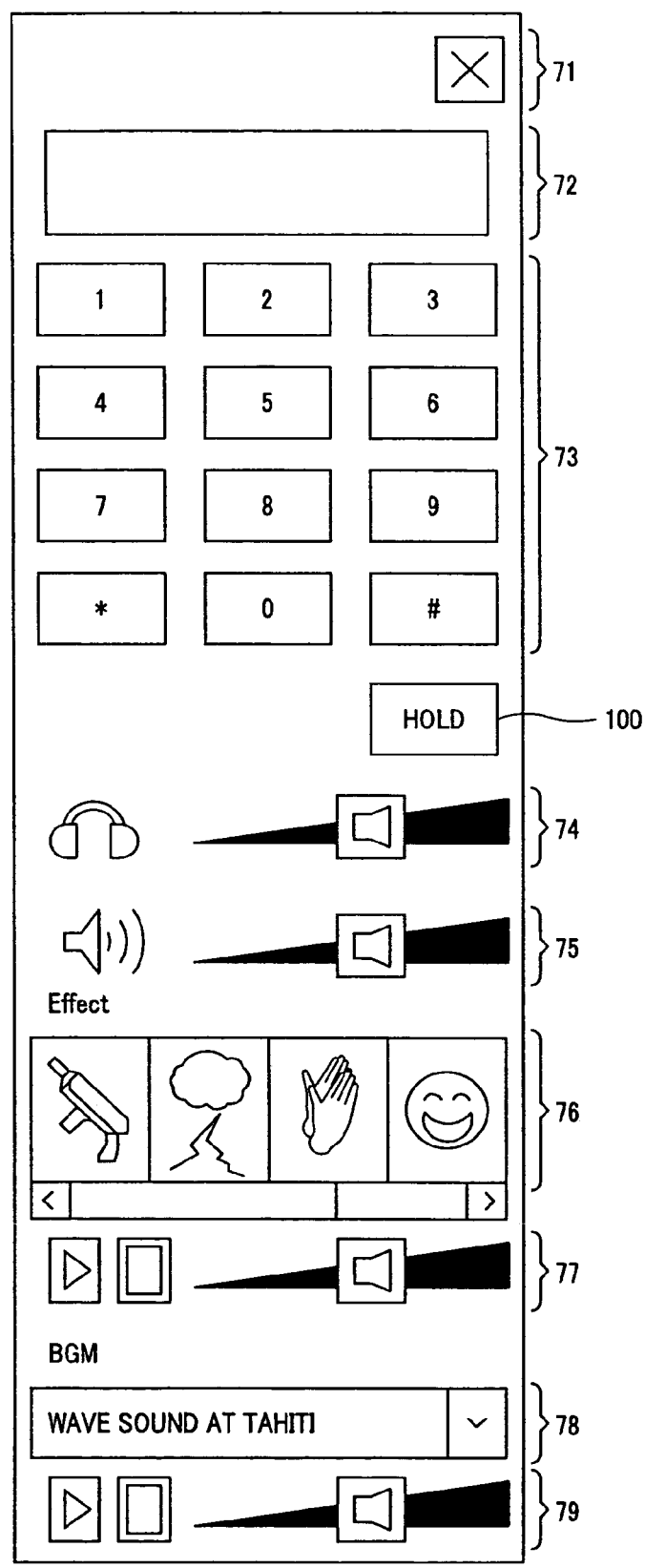
FIG. 10 shows a holding button on the GUI.

For example, if the VoIP client 2 is the caller and, as the user is speaking, the user's call is mixed with the BGM, and the user clicks a hold button 100 on the GUI of FIG. 10, the gain coefficient is automatically changed over to k3 in the gain adjustment unit 21 to give a larger sound volume in place of the sound volume set as BGM.

Figure 11:
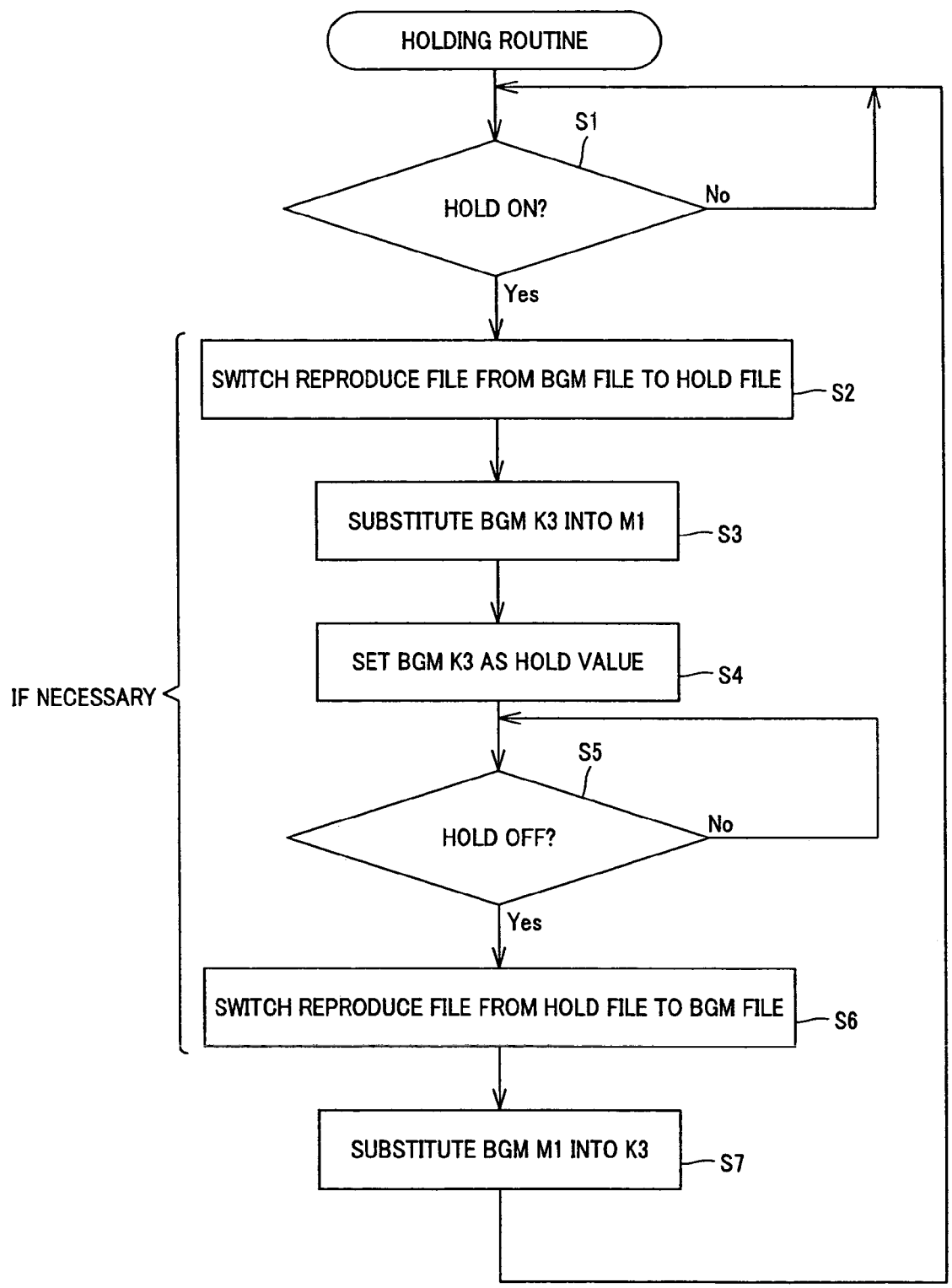
FIG. 11 is a flowchart showing a processing sequence of a holding tone routine.

FIG. 11 shows an example of the holding tone routine. If it is verified in a step S1 that the hold button 100 of the GUI has been clicked and the hold ON state has been set (YES), the VoIP client 2 changes over the reproducing file from the BGM file to the hold file (step S2) and substitutes the BGM coefficient k3 for the call time into M1 (memory) (step S3). The BGM coefficient k3 is set to the level of the pre-set hold value (step S4). If then the hold button on the GUI is clicked and the hold OFF state has been confirmed (step S5), the reproducing file is switched from the hold file to the BGM file (step S6) and the value so far substituted into the M1 (memory) for BGM is substituted into k3 for use as BGM.

Figure 12:
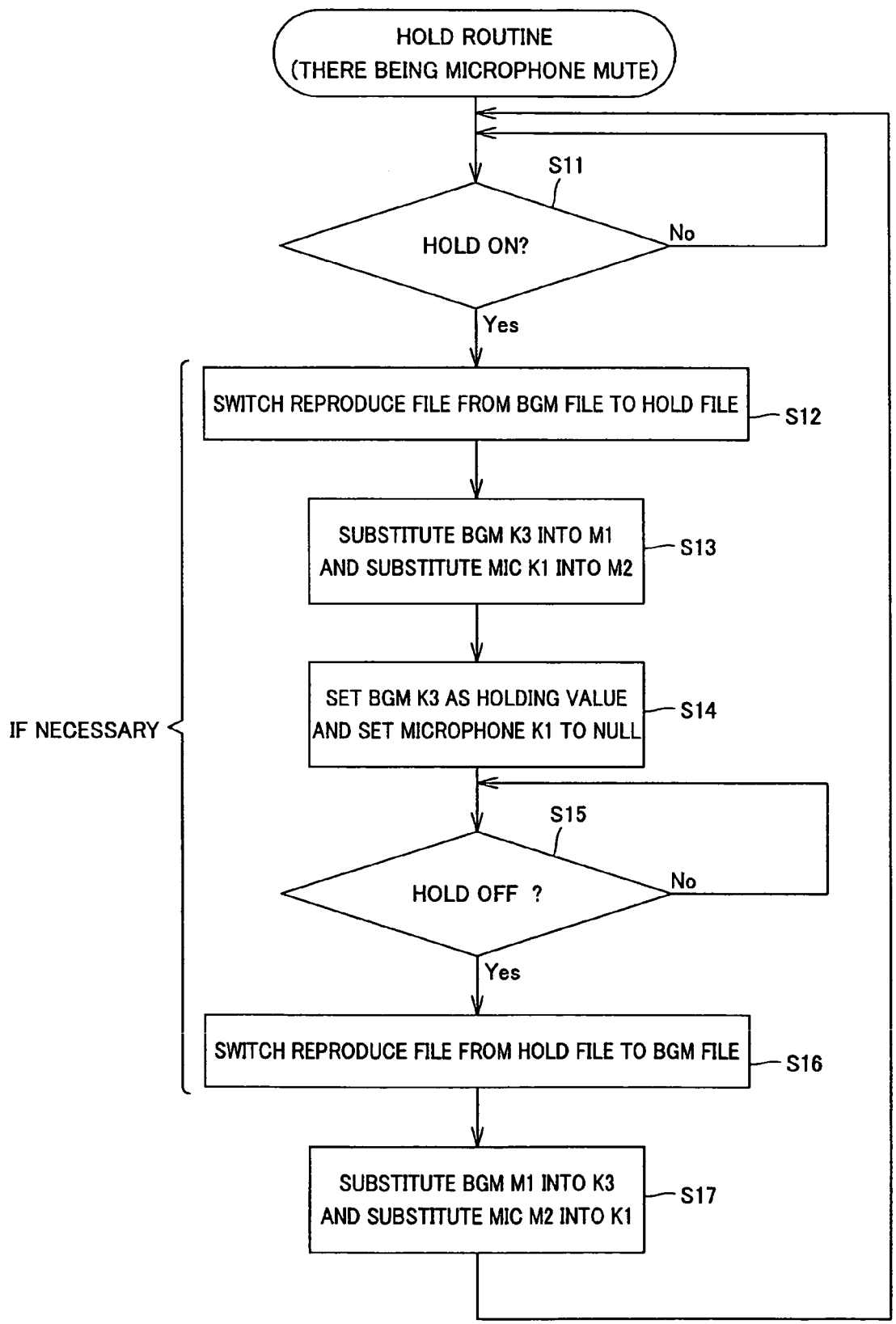
FIG. 12 is a flowchart showing another processing sequence of a holding tone routine.

In changing over to the holding tone, the gain may simultaneously be set to zero for muting the sound volume of the microphone 7a. FIG. 12 shows an example of a holding routine in this case. If it is determined in a step S11 that the hold button 100 of GUI has been clicked and the hold ON state has been set (YES), the VoIP client 2 changes over the reproducing file from the BGM file to the hold file (step S12) and substitutes the BGM coefficient k3 for call time into M1 (memory), while substituting the value of the coefficient k1, multiplied by the output of the microphone 7a, into M2 (memory) (step S13). The BGM coefficient k3 is set to the level of the preset hold value, and the coefficient k1 for the microphone 7a is set to NULL (step S14). This raises the sound volume level of the BGM for holding tone, while the microphone 7a is turned off. If then the hold button is clicked on the GUI and the hold OFF state has been confirmed (step S15), the reproducing file is changed over from the holding file to the BGM file (step S16). The value substituted in M1 (memory) for BGM is substituted into the coefficient k3 for use as BGM, while the coefficient k1 for the microphone 7a is set to a value so far stored in the memory (M2) (step S17). If then the hold button is pressed, the BGM sound volume level is automatically adjusted to enable the BGM to be used as the holding tone and to enable the microphone 7a to be turned off. On the other hand, if the hold button is re-clicked to set the hold OFF state, the sound volume level again reverts to that for BGM, while the switch of the microphone 7a is turned ON.

Thus, if the BGM is used as the holding tone, the coefficient k3 of BGM is automatically set to a preset value so that the BGM may be used as the holding tone of an appropriate sound volume. Moreover, the use of BGM as the holding tone simplifies the structure of the VoIP client 2.

A specified embodiment of a high efficiency audio compression encoding and decompression decoding method, exploiting the psychoacoustic characteristics, is now explained. This can be applied to the data codec method used in an encoder and a decoder shown in FIG. 2. Of course, the SE file and the BGM file, stored from the outset in the HDD, may be compressed and decompressed by this codec method.

Figure 13:
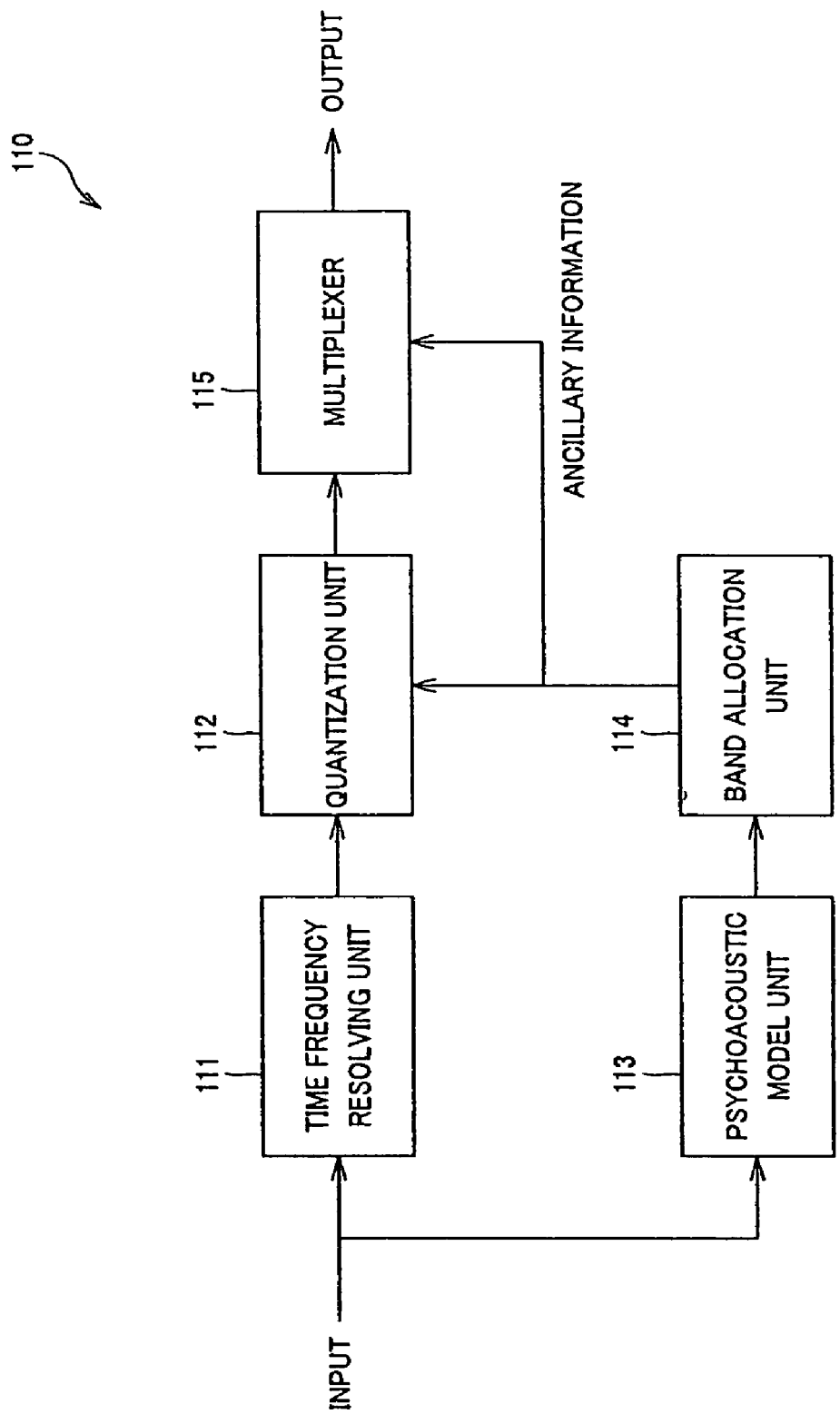
FIG. 13 is a block diagram showing a high efficiency audio compression encoder.
Figure 14:
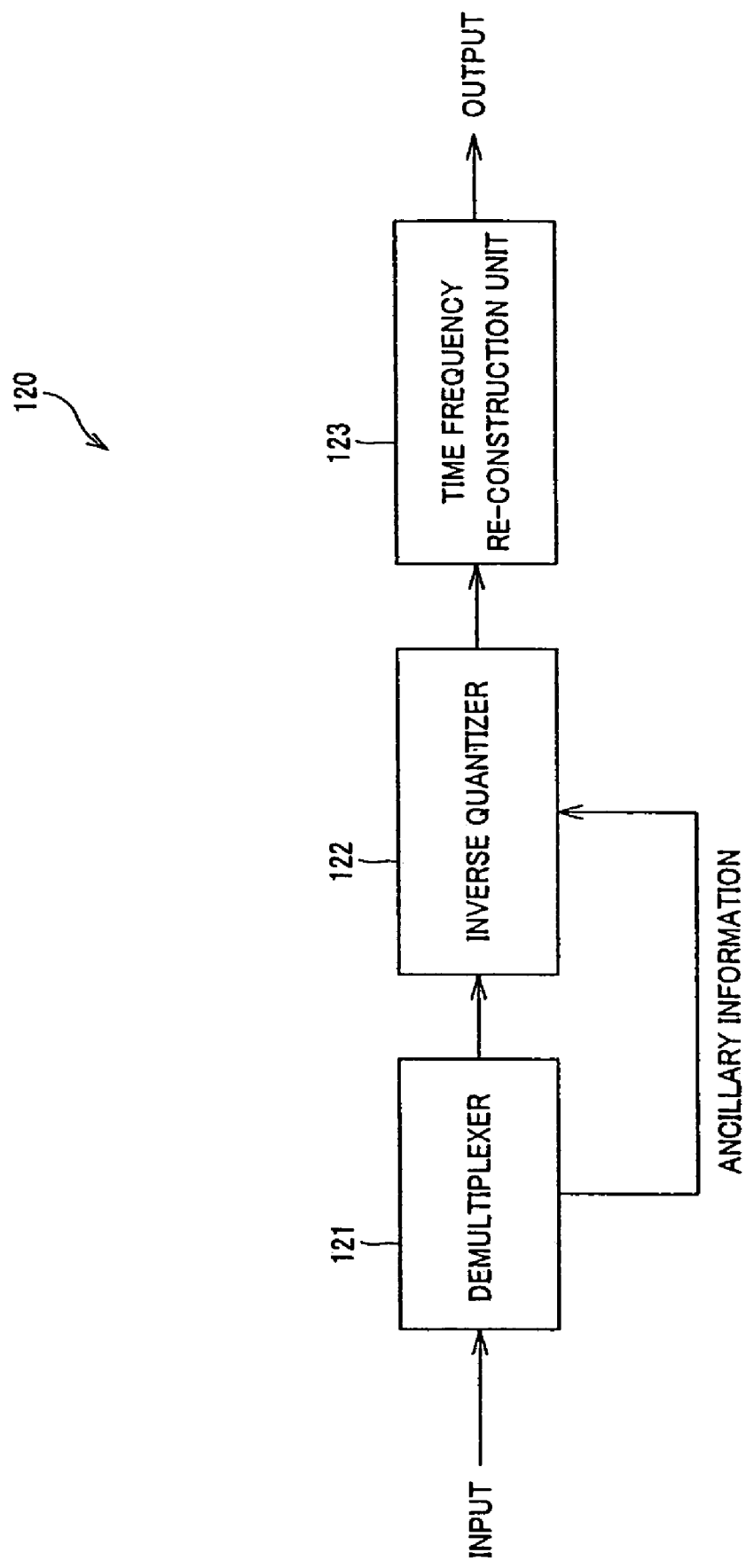
FIG. 14 is a block diagram showing a high efficiency audio decompression decoder.

FIGS. 13 and 14 are block diagrams showing a high efficiency audio compression encoding unit and a high efficiency audio decompression decoding unit, respectively. The high efficiency audio compression encoding unit 110 corresponds to the encoder 22 shown in FIG. 2, and comprises a time frequency resolving unit 111, a quantization unit 112, a psychoacoustic model unit 113, a band allocation unit 114 and a multiplexer 115, as shown in FIG. 13.

The time frequency resolving unit 111 converts time-domain signals into blocks or frames in terms of a preset unit time to transform the frame-based time-domain signals into signals on the frequency domain (by orthogonal transform) to split the signals into plural frequency bands.

The psychoacoustic model unit 113 splits the audio signals into plural (such as 25) bands, with bandwidths increasing with increase in the frequency (critical bands). The band allocation unit 114 allocates a preset number of bits or allocates adaptively changing numbers of bits from band to band (bit allocation). For example, if coefficient data obtained by modified discrete cosine transform (MDCT) are encoded by MDCT, adaptively variable numbers of bits are allocated to the band-based MDCT coefficient data obtained by the frame-based MDCT processing.

The quantization unit 112 determines the quantization step or the quantization size, based on the numbers of bits allocated from band to band, to carry out the quantization.

The multiplexer 115 multiplexes the quantized data, along with the subsidiary information, such as number of bits, allocated by a band allocation unit, and outputs the resultant data.

With this high efficiency encoding method, such bit allocation may be made in which the total bit rate of the entire audio information channels is variable and does mot exceed a preset maximum value.

Referring to FIG. 14, the high efficiency audio decompression decoding unit 120 includes a demultiplexer 121, an inverse quantizer 122 and a time frequency re-construction unit 123. The demultiplexer 121 is supplied with the high efficiency encoded data and demultiplexes the so supplied encoded data. The inverse quantizer 122 inverse-quantizes the quantized data, based on the subsidiary information, such as the band information, taken out from the demultiplexer 121, while the time frequency re-construction unit 123 transforms the time-domain data into frequency-domain data, to output the resulting frequency-domain data.

The above-described high efficiency audio compression encoding unit 110 provides for call of high audio quality.

The above-described embodiment is arranged so that the PC as the VoIP client executes the VoIP client program. Alternatively, the VoIP client may be a mobile phone or PDA performing the function shown in FIG. 2. Still alternatively, the VoIP client may also be an apparatus implementing the functional unit of FIG. 2 as the hardware.

What is claimed is:

1. A call apparatus for bidirectional communication for dialog by voice over a network, said call apparatus comprising, as a transmitting system, first gain adjustment means for multiplying voice signals from voice transducing means with a variable gain coefficient to adjust the gain, said voice transducing means transducing the voice, as picked up, into electrical signals;

sound data storage means having stored therein sound data in terms of a file as a unit;

decoding means for decoding file-based sound data read out from said sound data storage means;

second gain adjustment means for multiplying a decoded output from said decoding means with a variable gain coefficient to adjust the gain independent of the first gain adjustment means;

synthesizing means for synthesizing a first output from said first gain adjustment means and a second output from said second gain adjustment means;

encoding means for encoding a synthesized output of said synthesizing means; and transmitting means for transmitting an encoded output from said encoding means over said network;

said call apparatus also comprising, as a receiving system, receiving means for receiving an encoded output, transmitted from transmitting means of another call apparatus over said network;

decoding means for decoding encoded data received by said receiving means;

third gain adjustment means for multiplying a decoded output from said decoding means with a variable gain coefficient to adjust the gain; and sound outputting means for transducing an output from said third gain adjustment means into sound to output the sound.

2. The call apparatus according to claim 1 wherein said sound data storage means has stored therein data of music as the sound sustained for several minutes as a time unit and data of the effect sound sustained for several seconds as a time unit.

3. The call apparatus according to claim 2 wherein said sound data storage means has stored therein a file of said music or the effect sound, downloaded from a server connected to the Internet.

4. The call apparatus according to claim 3 wherein said file of said music or the effect sound states the information on the default sound volume and the sound volume width.

5. The call apparatus according to claim 1 wherein said bidirectional communication is carried out over the Internet.

6. The call apparatus according to claim 5 wherein said bidirectional communication, carried out over the Internet, is the communication in keeping with the Realtime Transport Protocol.

7. The call apparatus according to claim 6 wherein said transmitting system includes packetizing means for packetizing an encoded output from said encoding means to deliver the packetized encoded output to said transmitting means and wherein said receiving means includes depacketizing means for depacketizing a packet received by said receiving means.

8. The call apparatus according to claim 1 wherein, if, during a call with said other call apparatus, employing a synthesized output from said synthesizing means, a holding button is actuated on the transmitting side of said call apparatus or said other call apparatus, said second gain adjustment means substitutes a preset value, provided in advance, for the gain coefficient adapted to be multiplied with music data which is the sound sustained for several minutes as a unit, and which has been stored in said sound data storage means.

9. The call apparatus according to claim 8 wherein, when the holding button is actuated on the transmitting side, said first gain adjustment means multiplies voice signals from voice transducing means with 0 gain coefficient to turn the voice off.

10. The call apparatus according to claim 8 wherein, when the holding button is actuated on the transmitting side, said voice transducing means is turned off.

11. A call method for bidirectional communication for dialog by voice over a network, said call method comprising, on a transmitting side, a first gain adjustment step of multiplying voice signals from voice transducing means with a variable gain coefficient to adjust the gain, said voice transducing means transducing the voice, as picked up, into electrical signals;

a decoding step of decoding file-based sound data read out from sound data storage means, having sound data stored therein on the file basis;

a second gain adjustment step of multiplying a decoded output from said decoding step with a variable gain coefficient to adjust the gain independent of the first gain adjustment;

a synthesizing step of synthesizing a first output from said first gain adjustment step and a second output from said second gain adjustment step;

an encoding step of encoding a synthesized output of said synthesizing step; and a transmitting step of transmitting an encoded output from said encoding step over said network;

said call method also comprising, on a receiving side, a receiving step of receiving an encoded output, transmitted from said transmitting step performed by another call apparatus over said network;

a decoding step of decoding encoded data received by said receiving step;

a third gain adjustment step of multiplying a decoded output from said decoding step with a variable gain coefficient to adjust the gain; and a sound outputting step of transducing an output from said third gain adjustment step into sound to output the sound.

12. The call method according to claim 11 wherein said sound data storage means has stored therein data of music as the sound sustained for several minutes as a time unit and data of the effect sound sustained for several seconds as a time unit.

13. The call method according to claim 11 wherein said bidirectional communication is carried out over the Internet.

14. The call method according to claim 11 wherein said bidirectional communication, carried out over the Internet, is the communication which is in keeping with the Realtime Transport Protocol.

15. The call method according to claim 14 wherein said transmitting side includes a packetizing step of packetizing an encoded output from said encoding step to deliver the packetized encoded output to said transmitting step and wherein said receiving step includes a depacketizing step of depacketizing a packet received by said receiving step.

16. The call method according to claim 11 wherein, if, during a call with said other call apparatus, employing a synthesized output from said synthesizing step, a holding button is actuated on the transmitting side of said call apparatus or said other call apparatus, said second gain adjustment step substitutes a preset value, provided in advance, for the gain coefficient adapted to be multiplied with music data, which is the sound sustained for several minutes as a unit, and which has been stored in said sound data storage means.

17. The call method according to claim 16 wherein, when the holding button is actuated on the transmitting side, said first gain adjustment step multiplies voice signals from the voice transducing means with 0 gain coefficient to turn the voice off.

18. The call method according to claim 16 wherein, when the holding button is actuated on the transmitting side, said voice transducing step is turned off.

19. A call system for bidirectional communication for dialog by voice, using a plurality of call apparatus connected to the Internet; each of said call apparatus including, as a transmitting system, first gain adjustment means for multiplying voice signals from voice transducing means with a variable gain coefficient to adjust the gain, said voice transducing means transducing the voice, as picked up, into electrical signals;

sound data storage means having stored therein sound data in terms of a file as a unit;

decoding means for decoding file-based sound data read out from said sound data storage means;

second gain adjustment means for multiplying a decoded output from said decoding means with a variable gain coefficient to adjust the gain independent of the first gain adjustment means;

synthesizing means for synthesizing a first output from said first gain adjustment means and a second output from said second gain adjustment means;

encoding means for encoding a synthesized output of said synthesizing means; and transmitting means for transmitting an encoded output from said encoding means over said network;

said call apparatus also comprising, as a receiving system, receiving means for receiving an encoded output, transmitted from transmitting means of another call apparatus over said network;

decoding means for decoding encoded data received by said receiving means;

third gain adjustment means for multiplying a decoded output from said decoding means with a variable gain coefficient to adjust the gain; and sound outputting means for transducing an output from said third gain adjustment means into sound to output the sound.

* * * * *